(12) United States Patent
Fausse

(10) Patent No.: US 7,197,649 B1
(45) Date of Patent: Mar. 27, 2007

(54) SECURE OPTICAL DISK AND METHOD FOR SECUREMENT OF AN OPTICAL DISK

(75) Inventor: Arnaud Fausse, Paris (FR)

(73) Assignee: Axalto SA, Meudon (FR)

( * ) Notice: Subject to any disclaimer, the term of this patent is extended or adjusted under 35 U.S.C. 154(b) by 0 days.

(21) Appl. No.: 09/914,282

(22) PCT Filed: Feb. 25, 2000

(86) PCT No.: PCT/FR00/00483

§ 371 (c)(1),
(2), (4) Date: Jan. 3, 2003

(87) PCT Pub. No.: WO00/51119

PCT Pub. Date: Aug. 31, 2000

(30) Foreign Application Priority Data

Feb. 26, 1999 (FR) .................................. 99 02474

(51) Int. Cl.
*G06F 12/14* (2006.01)
*H04L 9/10* (2006.01)

(52) U.S. Cl. ........................................ 713/193; 726/26

(58) Field of Classification Search ................ 713/193; 726/26
See application file for complete search history.

(56) References Cited

U.S. PATENT DOCUMENTS

| 5,119,353 | A | * | 6/1992 | Asakura .................. 369/13.01 |
| 5,652,838 | A | * | 7/1997 | Lovett et al. .................. 726/30 |
| 5,790,489 | A | * | 8/1998 | O'Connor .................. 369/52.1 |
| 5,905,798 | A | * | 5/1999 | Nerlikar et al. ................ 705/57 |
| 6,005,940 | A | * | 12/1999 | Kulinets ....................... 705/51 |
| 6,042,009 | A | * | 3/2000 | Barrett et al. ................ 235/441 |
| 6,526,144 | B2 | * | 2/2003 | Markandey et al. .......... 380/28 |

FOREIGN PATENT DOCUMENTS

| DE | 42 42 247 A1 | | 6/1994 |
| DE | 4242247 A1 | * | 6/1994 |
| EP | 0 774 706 A1 | | 5/1997 |
| EP | 0 809 245 A2 | | 11/1997 |
| EP | 0 849 734 A2 | | 6/1998 |
| FR | 2 643 475 | | 8/1990 |

OTHER PUBLICATIONS

International Search Report dated May 4, 2000 with English Translation (6 pages).
International Preliminary Examination Report dated Feb. 14, 2001 with English Translation (19 pages).

* cited by examiner

*Primary Examiner*—Emmanuel L. Moise
*Assistant Examiner*—Michael Pyzocha
(74) *Attorney, Agent, or Firm*—Osha Liang LLP

(57) ABSTRACT

The invention concerns a protected optical disk for storing data. It also concerns a method for protecting said disk. The invention is characterized in that said disk firstly comprises a portable object comprising a memory including at least one secret key, and secondly data exchange means, said key making it possible to decrypt the data of said disk whilst remaining in said portable object, said exchange means making it possible to exchange said data between said portable object and said disk. The invention can be applied in particular to CD-ROMs.

36 Claims, 8 Drawing Sheets

SECURE OPTICAL DISK AND METHOD FOR SECUREMENT OF AN OPTICAL DISK

FIELD OF INVENTION

The present invention concerns an optical disk for storing data. It also concerns a method for protecting said disk.

Applications of the invention can be particularly advantageous in fields such as data processing, games, audiovisual, etc. Data storage media, especially optical disks, include data intended to be generally exploited on a terminal, such as a computer or television monitor. Said data are either texts, images, sound or even software applications.

BACKGROUND OF THE INVENTION

A large number of fraudulent copies of data contained in said media are made using software accessible to all users. These software applications are able to duplicate the data of a media despite copyright which generally protects said data. One known device of the prior art makes use of a security box to prevent pirate copies being made of the data contained in a media. The box, which contains an electronic identification circuit, is connected for example to a computer into which said media is introduced. Said device discloses the presence of a programme in the media making it possible to identify the security box by means of said electronic circuit. The programme is loaded into the computer and then carries out identification. In the absence of the appropriate box, the data cannot be read and accordingly the media cannot be used. The device only offers minimum security to the extent that the verification programme can be neutralised on the computer and then there is no longer any protection. Moreover, a protection box is generally associated with a single media item. As a result, the management of security becomes cumbersome and complex since a new protection box is required for any new media item.

SUMMARY OF THE INVENTION

It is possible to protect an optical disk using a transponder. A disk reader is fitted with a radio-frequency interrogator. The interrogator transmits an interrogation signal. In response to this signal, the transponder transmits a response signal. This response signal enables the reader to access a decryption algorithm. Decryption is made in the reader. The European patent application published under the number 0849734 seems to describe this optical disk protection.

Also one technical problem to be resolved by the object of the present invention is obtaining a protected data storage optical disk, as well as a method for rendering secure said disk making it possible to avoid fraudulent copies being made of the data contained in said disks whilst not burdening the use of said disks.

According to a first object of the present invention, one solution to the technical problem stated is characterised in that said optical disk includes a decryption module comprising:

a memory including at least one secret key, a cryptoprocessor for decrypting the data of said disk from said key, and data exchange means making it possible to apply the data of said disk to the cryptoprocessor and reading the decrypted data of the cryptoprocessor.

According to the present invention, a method for reading this optical disk is notable in that said method comprises the following stages:

an application stage in which the data of said disk is applied to the cryptoprocessor via the data exchange means, a decryption stage in which the cryptoprocessor decrypts the data of said disk from said key, and An extraction stage in which the decrypted data are read from the cryptoprocessor via the data exchange means.

Thus, as shall be seen later in detail, the device of the invention is able to protect the data of the media by encrypting it and thus prevent a reading of the data in uncoded form. A copy of the data is unusable as said data is encrypted. To read said data, the latter need to be . . . previously decrypted by means of a secret key included in said object integrated in the data storage media. Preferably, the secret key is unique to one media item. Thus, a reading of data in uncoded form is only possible from said media.

The following description with regard to the accompanying drawings, given by way of non-restrictive examples, shall clearly explain of what the invention consists of and how it can be embodied.

BRIEF DESCRIPTION OF THE DRAWINGS

FIG. 1 shows a data storage media 10. Said media integrates a portable object 20 and data exchange means. Said media 10 comprises three main zones. The peripheral zone 11 is able to store data. The other two zones are central zones. One is a hole 13 placed at the centre of the media and in which a mechanical pin is able to slide, said zone thus corresponding to an axis of rotation. The other is a neutral zone 12 placed between the hole 13 and the peripheral zone 11 and contains no data. Said portable object 20 is integrated in a central zone of said media 10 which is the neutral zone 12. As shown on FIG. 2, the portable object 20 includes a memory 22 and a contacts block 23 for establishing electric contacts with a terminal, for example. The memory 22 includes a secret key K1. This key is preferably single for each media, in other words is no duplicate is provided either in the media to which it belongs or in other media. Said portable object 20 includes a cryptoprocessor 21. Said portable object is an integrated circuit chip. A chip is protected.

Said media 10 is an optical disk. An optical disk is a disk composed of tracks comprising data. Said data includes an application software such as a video game software or software for exploiting data bases.

The rest of the present summary of the invention deals with the example of CD-ROMs. Nevertheless, the invention of course can be applied generally to any other optical disk.

In the case of a CD-ROM, the data of a track are formatted according to standards, such as those called Yellow Book and Green Book defined by Philips. The standards basically define two data formatting modes. According to a first mode called mode 1, the track comprises user data, header data and error detection data able to have two error detection levels. According to a second mode called mode 2, the track comprises user data, header data and error detection data having a single error detection level. The header data includes a track number and start and end of track indicators. The user data includes the application software.

The media 10 has three major phases. A production phase, a customisation etching phase and a use phase.

Figure 1:
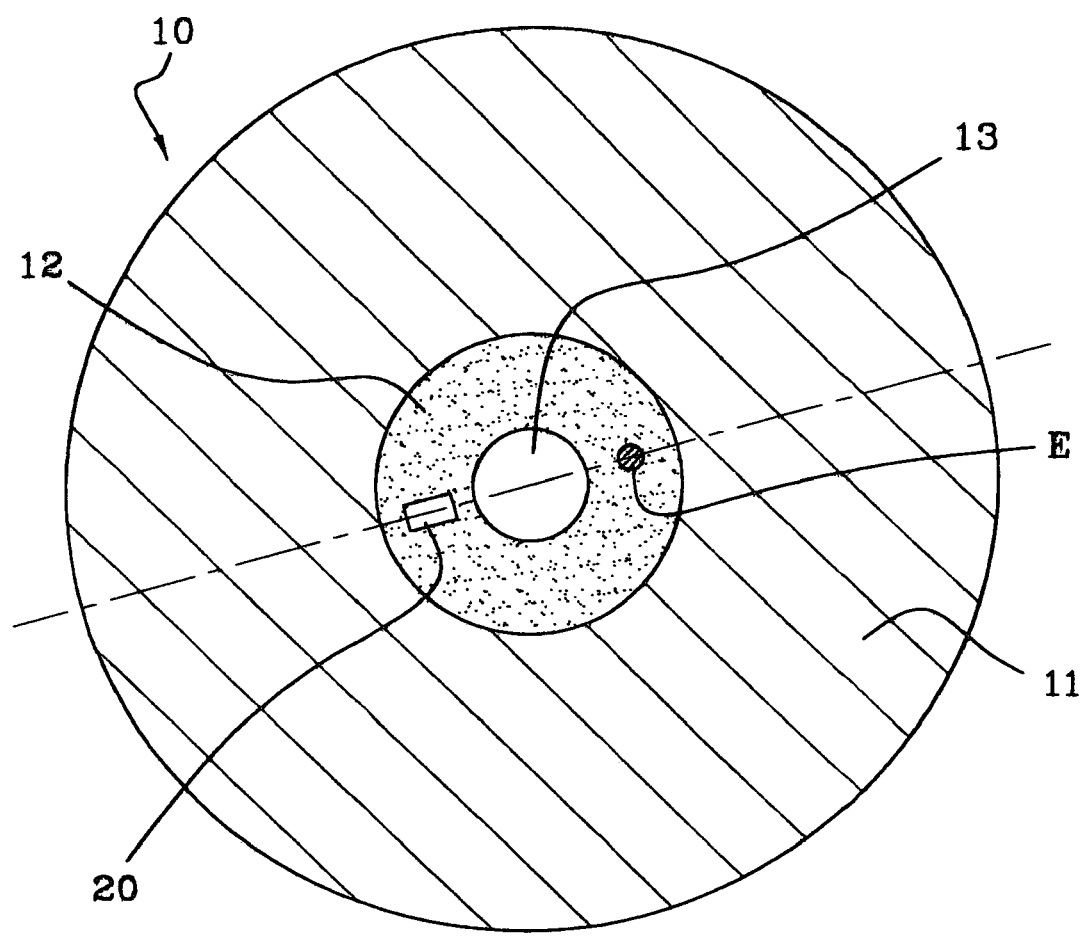
FIG. 1 is a top view of a storage media conforming to the invention.
Figure 2:
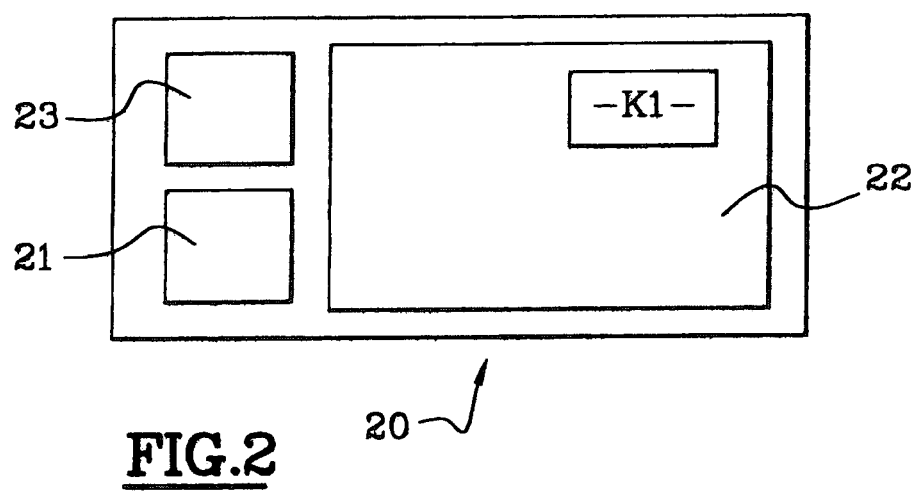
FIG. 2 is a diagram of a portable object included in the media of FIG. 1.

During the production phase, the media 10 is placed on a milling machine which makes a housing in which the portable object 20 is integrated. Said object is inserted and glued in the housing. However, the weight of said portable object can render said media 10 out of balance. So as to avoid this problem, said media 10 is provided with balancing means E for balancing said media by replacing its centre of gravity on its spin axis. One non-restrictive embodiment of said balancing means shall be effected with the aid of a balancing feeder composed of a metal washer glued into a milling made in said media, said feeder being diametrically opposite to said portable object 20 of the media 10, as shown on FIG. 1. The production phase is ended.

During the customisation etching phase, data is encrypted and written in the media 10. Encryption and writing, also called etching, are made using an etching machine. Said etching machine is mainly composed of the following elements:
   a probe provided with contacts allowing an exchange of data between a computer controlling said machine and the portable object 20 integrated in the media 10,
   a cryptoprocessor representing an encryption algorithm for encrypting the data to be etched,
   a secret key generating software,
   a software for loading secret keys into the portable object 20 of the media 10.

The customisation-etching phase occurs according to the following stages:
   an unrecorded media 10 is loaded,
   an individual set of secret keys is generated,
   the data to be encrypted is determined,
   the data is encrypted with the aid of a sole secret key K1,
   said encrypted data is written in said media 10, as well as non-encrypted data,
   the individual set of secret keys are loaded into the portable object 20 of the media 10.

The sole secret key K1 is derived from the generated individual set of keys. Said key K1 is either one of the keys from the set of keys or a combination of keys from said set. So as to have an optimised management of the keys and associated media, several keys or sets of keys may derive from a given key, for example when keys are diversified from a "master" key. Similarly, so as to facilitate media management, a given secret key could be used for a series of media able to be recognised for example by a series number.

It is possible to choose to encrypt all the data of the media or only one portion. A track comprises data blocks of two thousand and forty-eight octets. The data is encrypted by groups of eight octets if an encryption algorithm, such as the DES, is used. Other symmetrical encryption algorithms can be used. All the data is etched in the peripheral zone 11 of the media. Etching is effected using known methods, such as magneto-optical methods or laser colorant burn-off.

From now on, the media 10 can be used.

Figure 3:
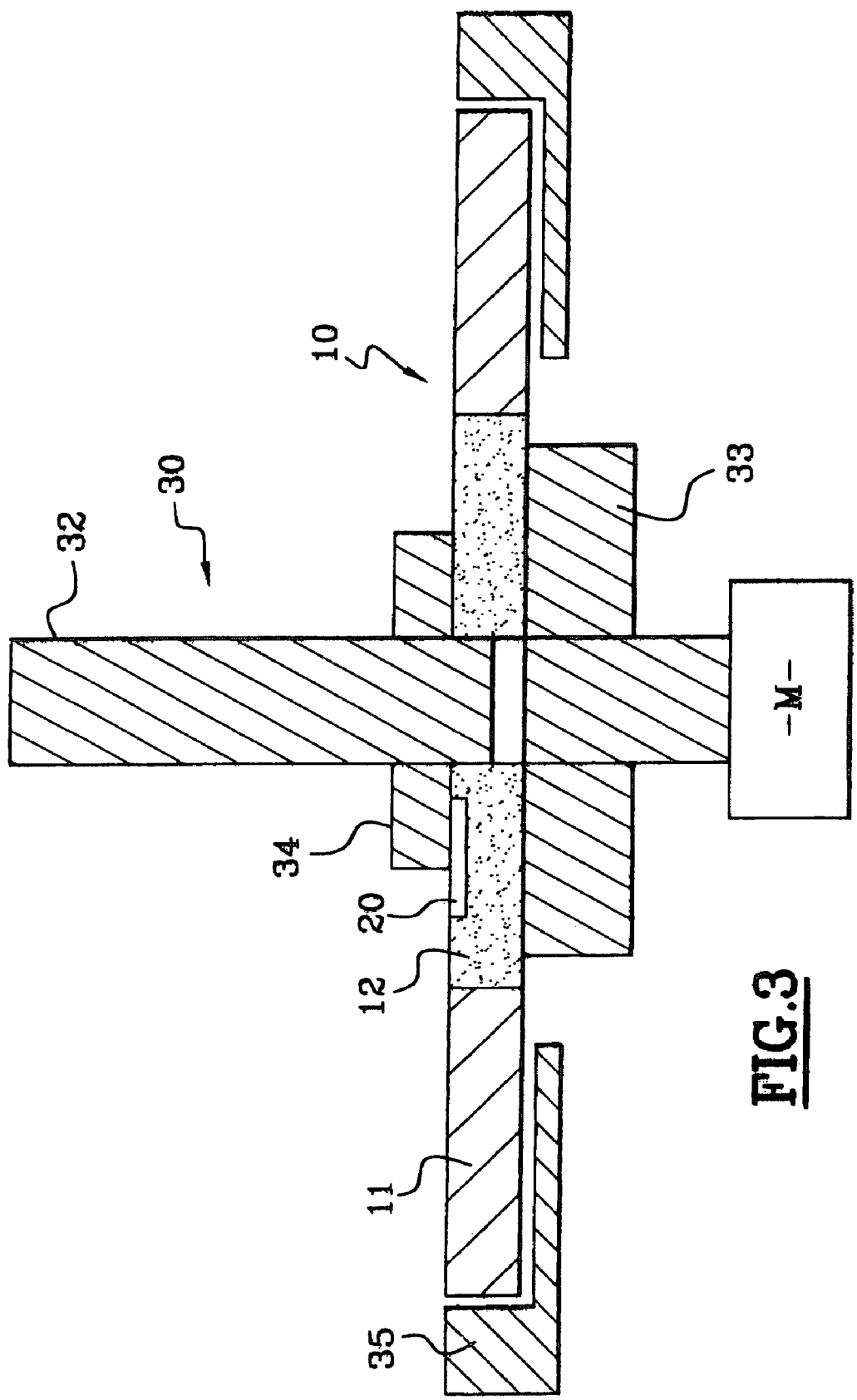
FIG. 3 is a side view of a media reader and the media of FIG. 1.

During the use phase, in one first stage the data found in the media 10 is read using a media reader 30. As shown on FIGS. 3 and 4, the reader is basically composed of a plate 35 housing the media 10, a motor M for making the media rotate, a mechanical spindle 32 which slides into the hole 13 of the media 10, two plates 33 and 34 for keeping the media 10 stable when the reader is functioning, a laser reading head 31 comprising in particular a laser diode and photodetectors, the laser diode being able to obtain a laser beam, an IDE or SCSI standard interface 36 for connecting said reader 30 to a computer 40, and a cryptoprocessor interface 37 allowing dialogue with the cryptoprocessor 21 of the portable object 20. The plate 34 is known as a doll and is integral with the spindle 32.

Reading is made optically with the laser beam and is defined in standards called the Blue Book published by Philips. It is carried out according to a method based on detecting the reflection of a laser beam on a track at one time reflecting and at another time absorbing, thus defining data appearing in the form of light. The laser beam is accordingly directed towards the photodetectors which are transducers allowing a conversion of the light into electric signals. Said electric signals are processed at a first level so as to eliminate any discordance errors during a data reading. The track is then reconstructed and then a second level corrector code is applied when the latter is formatted with the mode 1. As a result, said track is sent to the interface 36 of said media reader 30.

The media 10 and the media reader 30 contain no details enabling the encrypted data to be dissociated from the non-encrypted data of a track. This thus avoids a fraud being made which would consist of copying the indications relating to an encryption mode of the data contained in the media 10.

In a second stage, the media reader 30 recognises whether the media 10 is equipped with a cryptoprocessor. To this end, it sends the track read via its cryptoprocessor interface 37 to the media 10. In a case where data is sent back by said media via a first communication channel 361 open prior to reading of said media 10, said channel being included in the interface 36, the reader 30 shall conclude that a media 10 is present comprising a portable object 20 composed of a cryptoprocessor 21. In the opposite case, no data element is sent back and accordingly the media 10 contains no cryptoprocessor and data reading is made without decryption.

Figure 4:
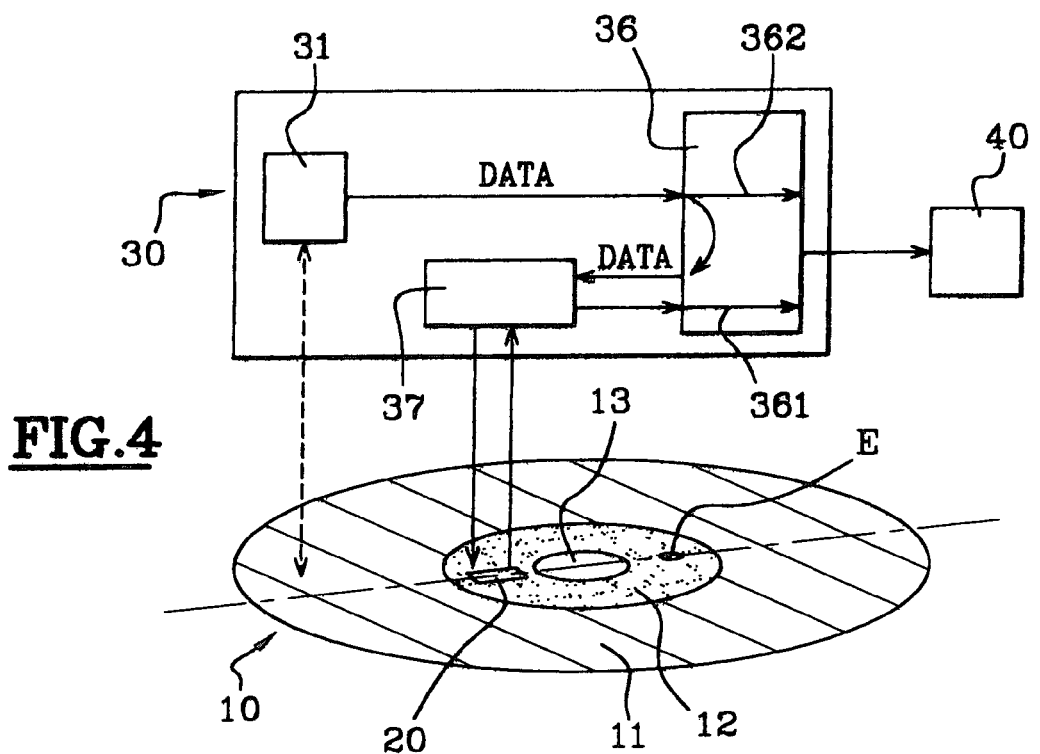
FIG. 4 is a logic diagram of the media reader of FIG. 3.

In a third stage in a case where the media 10 is equipped with a cryptoprocessor, as shown on FIG. 4, the read data DATA is sent to the computer 40 connected to said reader 30 via a second communication channel 362 open prior to reading of said media 10, said channel being included in the interface 36. This data is known as unprocessed data as said data has not been modified. At the same time, the read data DATA is sent to the cryptoprocessor 21. According to a first embodiment, said data DATA is sent via the cryptoprocessor interface 37. Thus, before being sent to the cryptoprocessor, the data DATA is firstly modified into a format able to be understood by the cryptoprocessor, such as into octets, via the cryptoprocessor interface 37 included in the optical disk reader.

Figure 5:
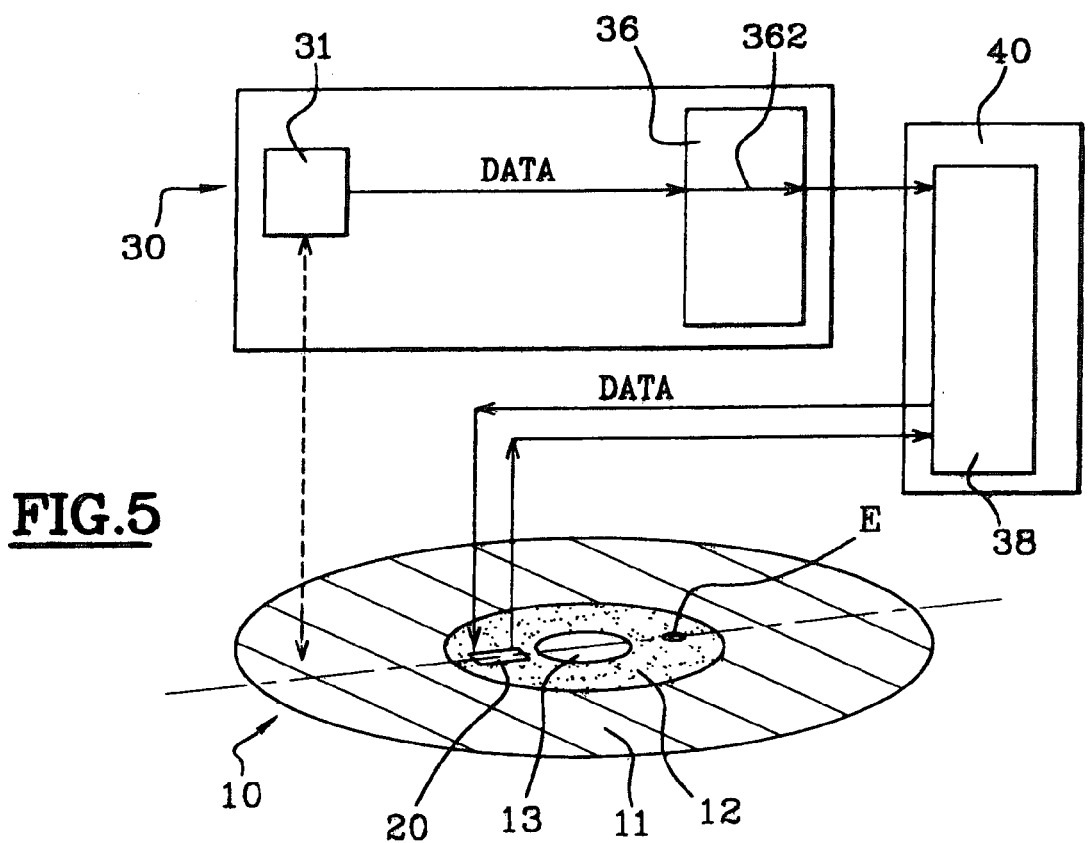
FIG. 5 is another logic diagram of the media reader of FIG. 3.

According to a second embodiment as shown on FIG. 5, said data DATA is sent to the cryptoprocessor 21 of the portable object 20 with the aid of an all-purpose series linking bus 38 known as a USB, said bus being integrated in the computer 40. Accordingly, a single communication channel included in the interface 36 of the reader 30 is required. The decrypted data in said cryptoprocessor 21 are then sent back to the computer 40 via this same bus 38. Here it is the computer 40 which comprises a cryptoprocessor interface which modifies the data DATA into a format able to be understood by the cryptoprocessor.

It shall be noted that this embodiment can also be used during the second stage described previously.

At the time the data DATA read is sent to the cryptoprocessor, the electric signals of the media reader 30 corresponding to said data are transferred to the media 10 and from the media 10 to the portable object 20 by means of data exchange means integrated in said media and via exchange means integrated in the media reader 30.

Either the data exchange means integrated in said media 10 have contacts or the data exchange means integrated in said media 10 have no contacts.

In the case of data exchange means with no contacts, according to a non-restrictive embodiment of the invention, the data exchange means integrated in said media 10 have an antenna. The data exchange means integrated in the reader 30 have a second antenna. In this case, the data is exchanged via inductive coupling between said first and second antennae.

Figure 6:
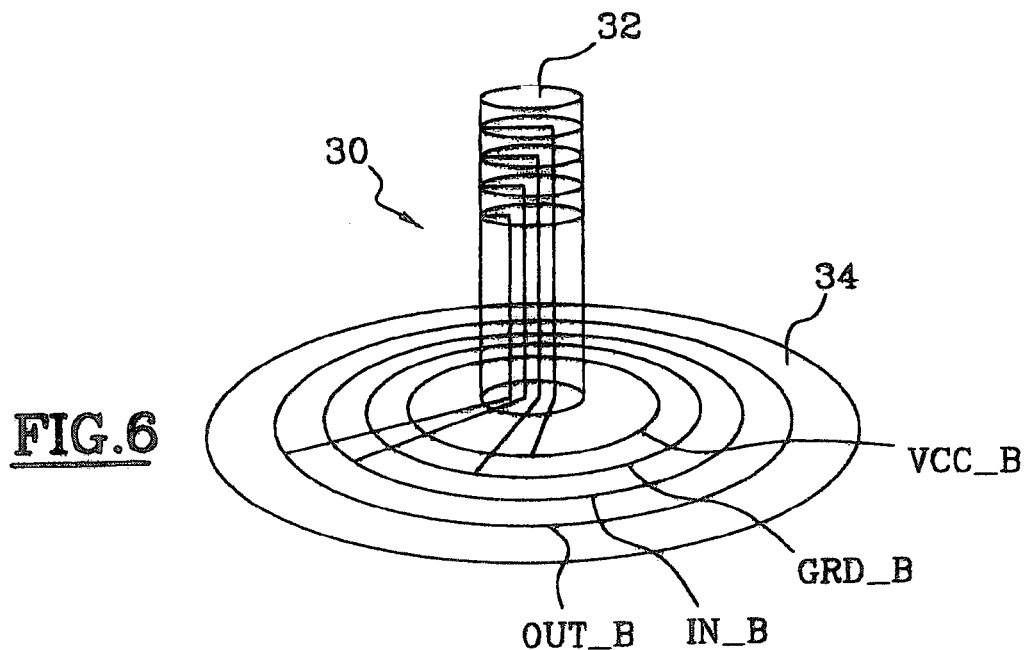
FIG. 6 is a partial perspective view of the media reader of FIG. 3.
Figure 7:
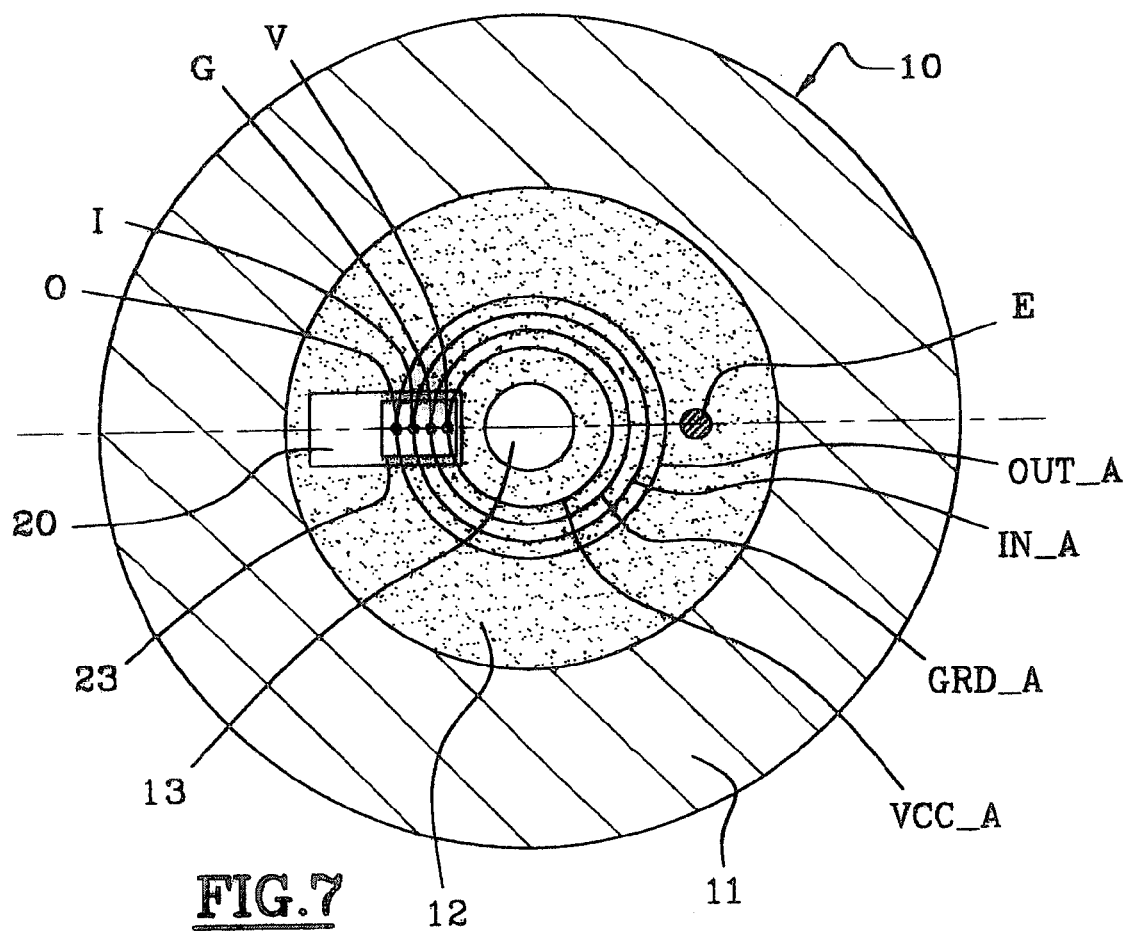
FIG. 7 is a top view of a first embodiment of the media of FIG. 1.

In the case of data exchange means with contacts, according to a first non-restrictive embodiment of the invention as shown on FIG. 6, first exchange means IN_B, OUT_B, VCC_B and GRD_B are integrated in the media reader 30 at the level of the spindle 32 and the doll 34, and as shown on FIG. 7 the data exchange means IN_A, OUT_A, VCC_A and GRD_A are integrated in the media 10 at the level of a central zone which is the neutral zone 12. When the doll 34 is in contact with the media 10, the first means enter into contact respectively with the second means. This makes it possible to exchange data between said media reader and said media. In addition, the second means IN_A, OUT_A, VCC_A and GRD_A integrated in the media 10 are connected to the contact block 23 of the portable object are respective contact points I, O, V and G. Said second means IN_A, OUT_AZ, VCC_A and GRD_A also allow an exchange of data between said media 10 and said portable object 20. Thus, said data exchange means integrated in the media 10 and the reader 30 include input exchange means IN_A, IN_B, output exchange means OUT_A, OUT_B, feed means VCC_A, VCC_B and earthing means GRD_A, GRD_B.

The input exchange means IN_A and IN_B make it possible to transport the data from the media reader via the media 10. The contact point 1 and the input device IN_A make it possible to send the data of the media 10 to the portable object 20. The output exchange means OUT_A and OUT_B make it possible to transport data from the media 10 via the media reader 30. The contact point O and the output device OUT_A make it possible to transmit the data from the portable object 20 to the media 10. The feed means VCC_A and VCC_B feed said portable object 20 with voltage and the earthing means GRD_A and GRD_B enable said portable object to be earthed.

According to a second embodiment, the data input exchange means IN_A, IN_B and the data output exchange means OUT_A, OUT_B can be merged and thus be bidirectional exchange means.

It shall be noted that according to another embodiment, the first data exchange means IN_B, OUT_B, VCC_B and GRD_B integrated with the media reader 30 can be integrated at the level of the lower plate 33 of the reader.

Figure 8:
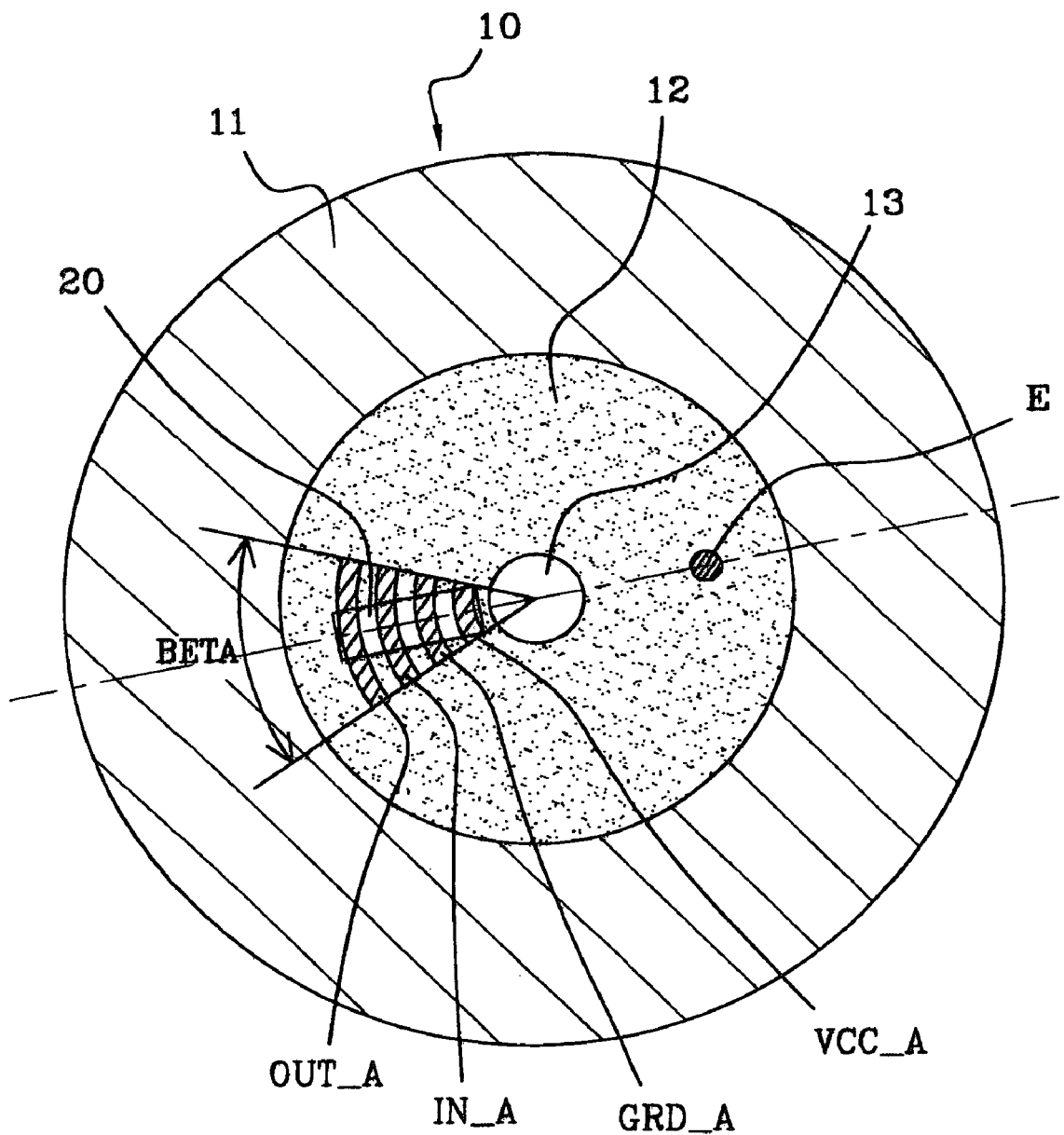
FIG. 8 is a top view of a second embodiment of the media of FIG. 1.
Figure 9:
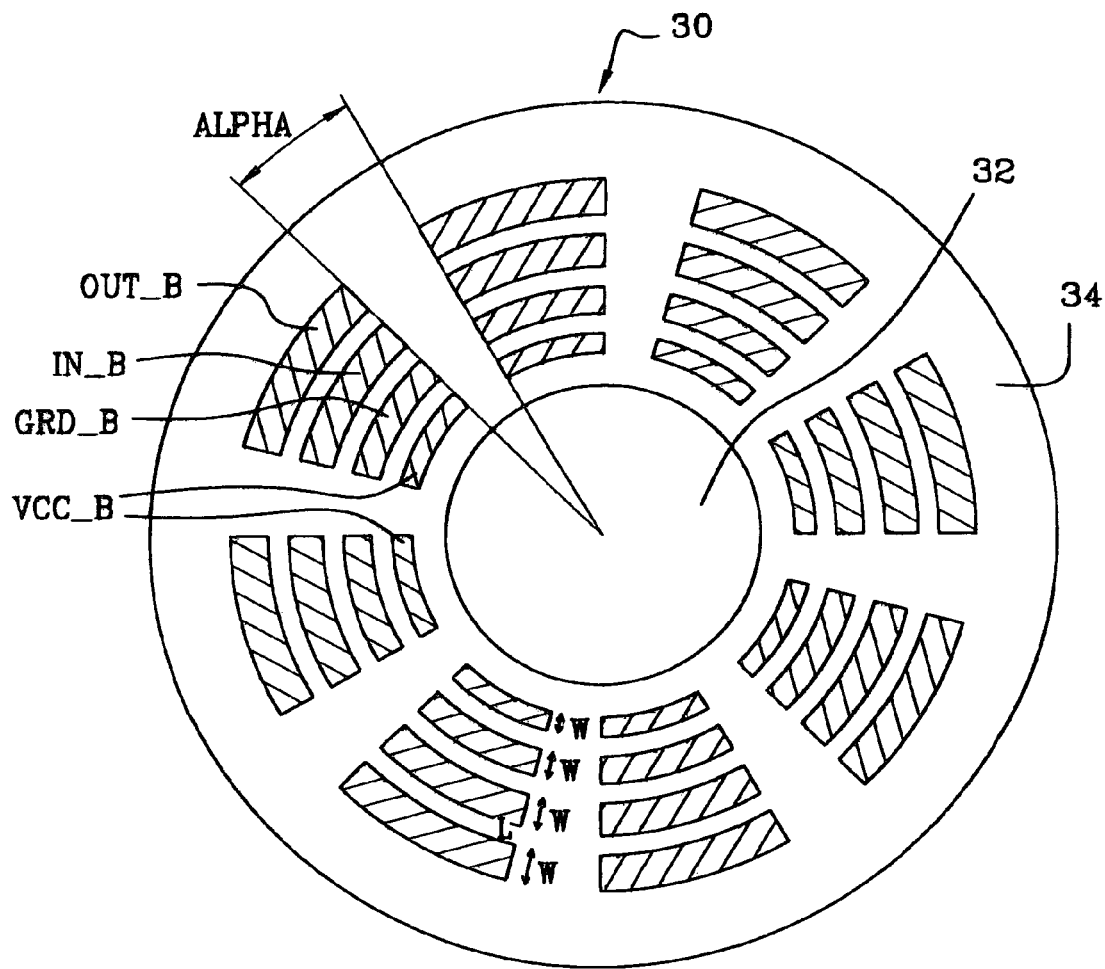
FIG. 9 is a partial top view of the media reader of FIG. 3.

So as to allow an effective transport of the electric signals, said data exchange means integrated in said media 10 are composed on a material allowing good conductivity and avoiding excessive oxidation of said means. Thus they are made of gold. For example, said means can be rings as shown on FIG. 7, wires or even arcs of circles as shown on FIG. 8. The same applies to the data exchange means integrated in the media reader 30. So as to avoid the presence of a loop sensitive to the electromagnetic radiation and thus avoid radio interference due to this radiation, the data exchange means integrated in said media 10 are arcs of circles forming a circular sector with a BETA angle and the data exchange means of the reader 30 are circle arcs spaced by an ALPHA angle smaller than the BETA angle, as shown on FIG. 9. The arcs of circles of the media 10 and the reader 30 have the same width W and are distant from a given width L. Thus, permanent contact is guaranteed between the various data exchange means.

After the electric signals corresponding to the read data DATA are sent to the portable object 20 by means of the previously defined data exchange means, the data is decrypted with the aid of a cryptoprocessor using the sole secret key K1 included in the memory 22 of the portable object 20. By means of this sole key system integrated in a portable object, a copy of the data of the media 10 on a second media, possibly comprising a cryptoprocessor, cannot be used.

Said cryptoprocessor represents an algorithm opposite the one used to encrypt said data. Said cryptoprocessor is programmed or wired.

According to a first non-restrictive embodiment, said cryptoprocessor is integrated in said portable object 20. The secret key K1 does not come out of the chip but stays there. According to a second embodiment, the cryptoprocessor is a cryptoprocessor attached to the media reader 30. In this second embodiment, the secret key K1 of the portable object 20 needs to be sent into the reader temporarily, namely the time to decrypt the read data DATA. It is clear that in this case there is no need to send the data DATA to the portable object 20. However, the first embodiment would be preferred, said embodiment offering far more protection given the fact that the secret key K1 remains in the portable object 20 and never transmitted outside and is thus not subject to frauds which would consist of spying on the media reader 30 so as to reconstruct said secret key K1. Moreover, the fact that the cryptoprocessor is in the portable object prevents a fraudulent person copying the means allowing encrypting or decrypting.

In the cryptoprocessor, the data DATA is decrypted systematically whether said data has been originally encrypted or not, and then if appropriate, are sent back to said reader 30 and finally sent to the computer 40 via the first communication channel 361 if the cryptoprocessor interface 37 is used.

Alternatively, the unprocessed and decrypted data DATA of said media 10 is loaded into a memory 41 of the computer 40. The computer could therefore mark the various sent sets of data. As shown on FIG. 10, the unprocessed B and decrypted D data is sent to the computer 40 preferably by tracks or complete blocks or octets. It shall be noted that the data, not originally encrypted but decrypted via the cryptoprocessor 21, are not useable. However, the fact that the reader 30 systematically sends the computer 40 the unprocessed and decrypted data makes it possible to be forewarned of an attack which would firstly consist of differentiating the encrypted and non-encrypted data, and secondly find a way to use them by quite simply being connected to the outlet of the media reader 30.

Figure 10:
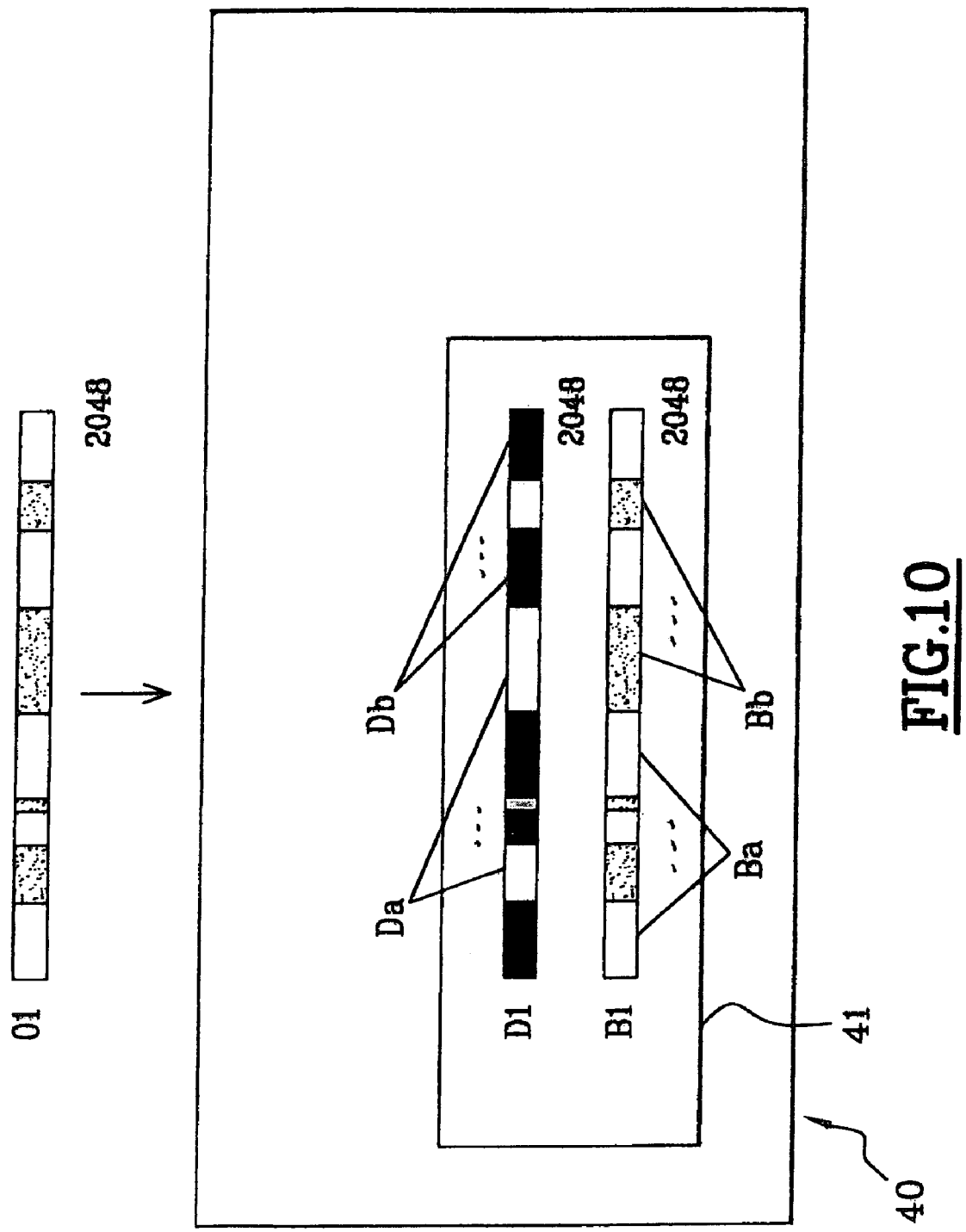
FIG. 10 is a diagram of the data originating from the media of FIG. 1.

In a fourth stage, the data sent and loaded into the memory 41 of the computer 40 is used as follows: said data, which includes the application software of the media 10, is composed of a pair of tracks or blocks, one track or block B1 being unprocessed and one track or block D1 being decrypted whose origin is a track or block O1 of data read in the media 10. FIG. 10 shows an unprocessed block B1 composed firstly of zones Ba of non-encrypted data known as useful zones, and secondly zones Db of decrypted unusable data unable and zones Da, also known as useful zones, of decrypted data corresponding to the zones Bd of encrypted data of the unprocessed block B1.

The application software firstly includes a self-starting programme recognised by the computer making it possible to initialise said software, and secondly the executable code. Said executable code includes a set of links for interconnecting various zones and load new data into the memory and reconstruct a data zone. Said start-up programme is initially loaded into the computer 40.

The useful zones of the various blocks generally comprise firstly a portion of the executable code, and secondly application data used by the application software, such as images, text, sound.

Figure 11:
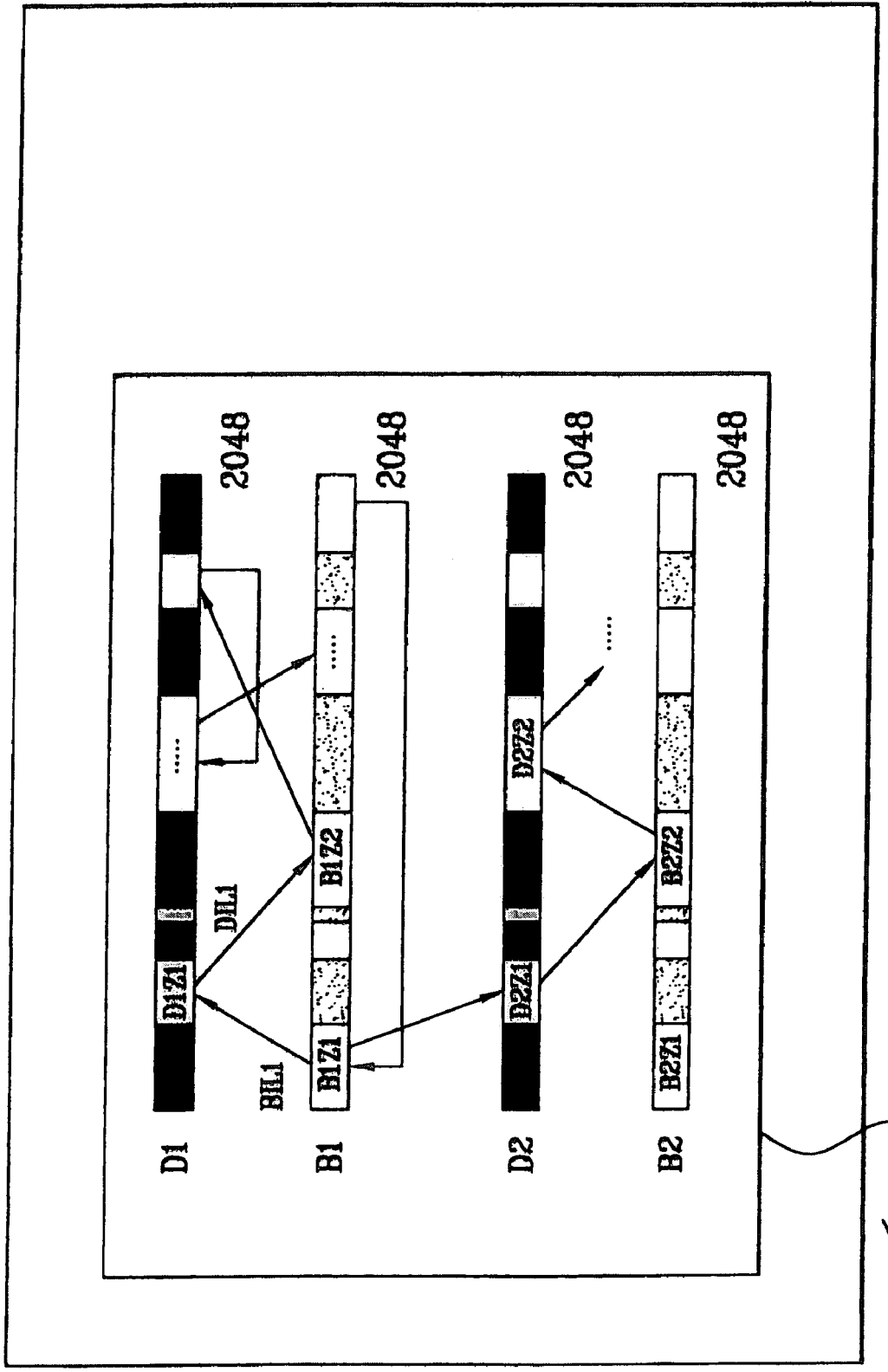
FIG. 11 is another diagram of the data originating from the media of FIG. 1.

As shown on FIG. 11, the unprocessed block B1 comprises a first useful zone B1Z1 whose executable code is executed and uses the application data required for said execution. At the end of execution of said code, a first link B1L1 is positioned on a first useful zone D1Z1 of the decrypted block D1. The code of said zone is executed. At the end of execution said code, a link D1L1 of said zone D1Z1 is positioned on a second useful zone B1Z2 of the unprocessed block B1 whose code is executed, and so on. When the final useful zone of the unprocessed block B1 is executed, a link makes it possible to load into the memory 41 of the computer the blocks or tracks of data required by the application software. Thus, one or several other pairs of unprocessed and decrypted tracks or blocks are read and loaded into the memory 41. Thus, according to the foregoing, it shall be extremely difficult for a person intent on fraud to reconstruct the executable code.

It shall be noted that, according to the optical disk 10 of the invention including a cryptoprocessor as previously described, the reader 30 could include a decryption service. Thus, data shall be sent from the computer 40 to the cryptoprocessor 21 of the media 10 so as to decrypt said data. This service shall be useful for certain security architectures in which the application software would have to decrypt track portions during execution of said software.

The invention described above has other advantages described hereafter. The invention has the advantage of firstly being able to protect applications written in a high level language, and secondly allow management of a large number of applications. To this end, the optical disk 10 comprises DATA forming at least one application written in high level language, especially in JAVA language (registered trademark). Said applications are preferably fully or partially encrypted. Thus, said applications are protected as described previously and could not be duplicated. Moreover, as the optical disk has a large memory capacity, it would be possible to manage a large number of applications. Thus, an applications supplier will be able to promote its applications and distribute them in bulk. Advantageously, the optical disk is accessible on writing/reading for an applications supplier. As a result, the supplier could itself manage the applications on the optical disk at any time. For example, at a point of sale, the supplier could download applications into a disk from one of its computers or servers.

The optical disk of the invention could be of interest in the field of mobile telephones. A mobile telephone comprises a telephone smart card currently known as an SIM card. According to a known prior art, when a user of the mobile telephone wishes to use a service of an operator, either the application relating to said service is found on his mobile telephone or needs to be downloaded into the SIM card from a server of the operator via a network managed by said operator. Often the operators offers new services, such as a banking telephone service, to users whose applications need to be downloaded. The applications are generally written in JAVA language so as to be able to be modified and managed by the operator. Downloading is a long process, less reliable and the network is often congested. In addition, the SIM card has a reduced memory and cannot support all the applications offered by the operator. By means of the optical disk of the invention, an operator can distribute its applications to users already protected and avoids its network becoming congested and the memory of the SIM card becoming overloaded. The user buys an optical disk comprising the applications relating to the services he needs. Thus, he merely needs to insert the optical disk into his computer and his SIM card into a card reader connected to his computer and select the application he wants to load into his card. It may be desired to have the optical disk only being accessible on reading by the user so as to prevent him from modifying certain data of the applications.

The invention claimed is:

1. An optical disk comprising:
   encrypted data, encrypted using at least one secret key;
   a memory including the at least one secret key;
   a cryptoprocessor configured to decrypt the encrypted data using the at least one secret key to obtain decrypted data; and
   a data exchange means configured to send the encrypted data to the cryptoprocessor and read the decrypted data from the cryptoprocessor.

2. The optical disk of claim 1, wherein cryptographic processor comprises a chip with an integrated circuit.

3. The optical disk of claim 1, wherein the cryptoprocessor is integrated in a central zone of the optical disk.

4. The optical disk of claim 1, wherein the data exchange means is integrated in a central zone of the optical disk.

5. The optical disk of claim 1, wherein the optical disk further comprises a balancing means for balancing the optical disk.

6. The optical disk of claim 1, wherein the data exchange means comprises contacts.

7. The optical disk of claim 1, wherein the data exchange means is fitted with a means for transmitting an energy field.

8. A method for reading an optical disk comprising the following stages:
   an application stage wherein encrypted data stored on the optical disk is sent to a cryptoprocessor via a data exchange means;
   a decryption stage wherein the cryptoprocessor uses at least one secret key to decrypt the encrypted data to obtain decrypted data; and
   an extraction stage wherein the decrypted data is read from the cryptoprocessor via the data exchange means;
   wherein the optical disk comprises a decryption module,
   wherein the decryption module comprises a memory including the at least one secret key, the cryptoprocessor, and the data exchange means.

9. The method of claim 8, further comprising an additional stage according to which:
   prior to the decryption stage, the encrypted data is modified into a format understood by the cryptoprocessor using a cryptoprocessor interface, wherein the cryptoprocessor interface is included in an optical disk reader.

10. The method of claim 8, further comprising an additional stage according to which:
prior to the decryption stage, the encrypted data is modified into a format understood by the cryptoprocessor using of a cryptoprocessor interface, wherein the cryptoprocessor interface is included in a computer.

11. The method of claim 8, wherein the optical disk further comprises non-encrypted data and wherein in the decryption stage the cryptoprocessor decrypts the encrypted data and the non-encrypted data.

12. The method of claim 8, further comprising an additional stage according to which:
a set of unprocessed data and a set of decrypted data are loaded onto a computer wherein both sets of data originate from a set of data read from the optical disk.

13. The method of claim 12, wherein the set of unprocessed data and the set of decrypted data are load onto the computer in an alternating manner.

14. The method of claim 12, wherein the set of unprocessed data comprises unusable encrypted data and the set of decrypted data comprises usable decrypted data.

15. The method of claim 14, wherein the set of unprocessed data comprises usable-non-encrypted data and the set of decrypted data comprises unusable decrypted data.

16. The method of claim 15, further comprising an additional stage according to which:
an executable code portion in one selected from a group consisting of usable-non-encrypted data and usable decrypted data is executed.

17. The method of claim 16, further comprising an additional stage according to which:
new data is loaded into the memory and a data zone is reconstituted with the aid of a set of links included in the executable code.

18. The method of claim 15, wherein the method comprises an additional stage comprising executing an executable code portion in one selected from a group consisting of usable-non-encrypted data and usable decrypted data.

19. A disk reader device configured to read an optical disk, comprising:
an interface for exchanging data with a decryption module,
wherein the decryption module is located on the optical disk,
wherein the decryption module comprises:
a memory including at least one secret key,
a cryptoprocessor configured to decrypt encrypted data stored on the optical disk using the at least one secret key, and
a data exchange means configured to receive encrypted data from the interface, send the encrypted data to the cryptoprocessor, read the decrypted data from the cryptoprocessor, and send the decrypted data to the interface.

20. A method for protecting an optical disk comprising:
an encryption stage wherein data is encrypted to obtain encrypted data using at least one secret key;
a writing stage wherein the encrypted data is written to an optical disk; and
a loading stage wherein the at least one secret key is loaded into a memory of a decryption module,
wherein said optical disk comprises the decryption module that includes the memory, a cryptoprocessor, and a data exchange means,
wherein the cryptoprocessor is configured to decrypt the encrypted data.

21. A method for protecting an optical disk, comprising:
decrypting encrypted data stored on the optical disk by a portable object using a secret key,
wherein the secret key is stored in a memory,
wherein the memory is located in the portable object,
wherein the portable object is integrated in the optical disk, and
wherein the secret key is not communicated outside of the portable object during decryption of the encrypted data, and
exchanging the encrypted data between the portable object and the optical disk using a data exchange means integrated in the optical disk.

22. The method of claim 21, wherein the portable object comprises a chip with an integrated circuit.

23. The method of claim 21, wherein the decryption stage is carried out using a cryptoprocessor integrated in portable object.

24. The method of claim 23, further comprising:
prior to decrypting the encrypted data, modifying the encrypted data into a format understood by the cryptoprocessor via a cryptoprocessor interface included in an optical disk reader.

25. The method of claim 23, further comprising:
prior to the decrypting the encrypted data, the encrypted data is modified into a format understood by the cryptoprocessor using a cryptoprocessor interface included in a computer.

26. The method of claim 21, wherein the optical disk further comprises non-encrypted data and wherein the cryptoprocessor decrypts the encrypted data and the non-encrypted.

27. The method of claim 21, further comprising:
loading a set of unprocessed data and a set of decrypted data into a computer wherein both sets of data originate from a set of data read in the optical disk.

28. The method of claim 27, wherein the set of unprocessed data and the set of decrypted data are load onto the optical disk in an alternating manner.

29. The method of claim 27, wherein the set of unprocessed data comprises a zone of unusable encrypted data, and the set of decrypted data comprises usable decrypted data.

30. The method of claim 29, wherein the set of unprocessed data comprises usable-non-encrypted data and the set of decrypted data comprises unusable decrypted data.

31. The method of claim 30, further comprising:
executing one executable code portion included in one selected from a group consisting of usable-non-encrypted data and usable decrypted data.

32. The method of claim 31, further comprising:
loading new data into the memory, and
reconstructing a data zone using a set of links included in the executable code.

33. The method of claim 30, wherein the method comprises an additional stage comprising executing one executable code portion included in one selected from a group consisting of usable-non-encrypted data and usable decrypted data.

34. The method of claim 21, further comprising:
encrypting data using the secret key;
storing the encrypted data on the optical disk.

35. The method of claim 21, wherein optical disk comprises at least one application written in a high-level language.

36. The method of claim 35, wherein the encrypted data comprises at least a portion of the application.

* * * * *